Figure 3:
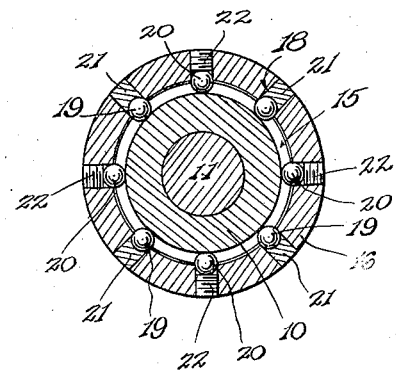

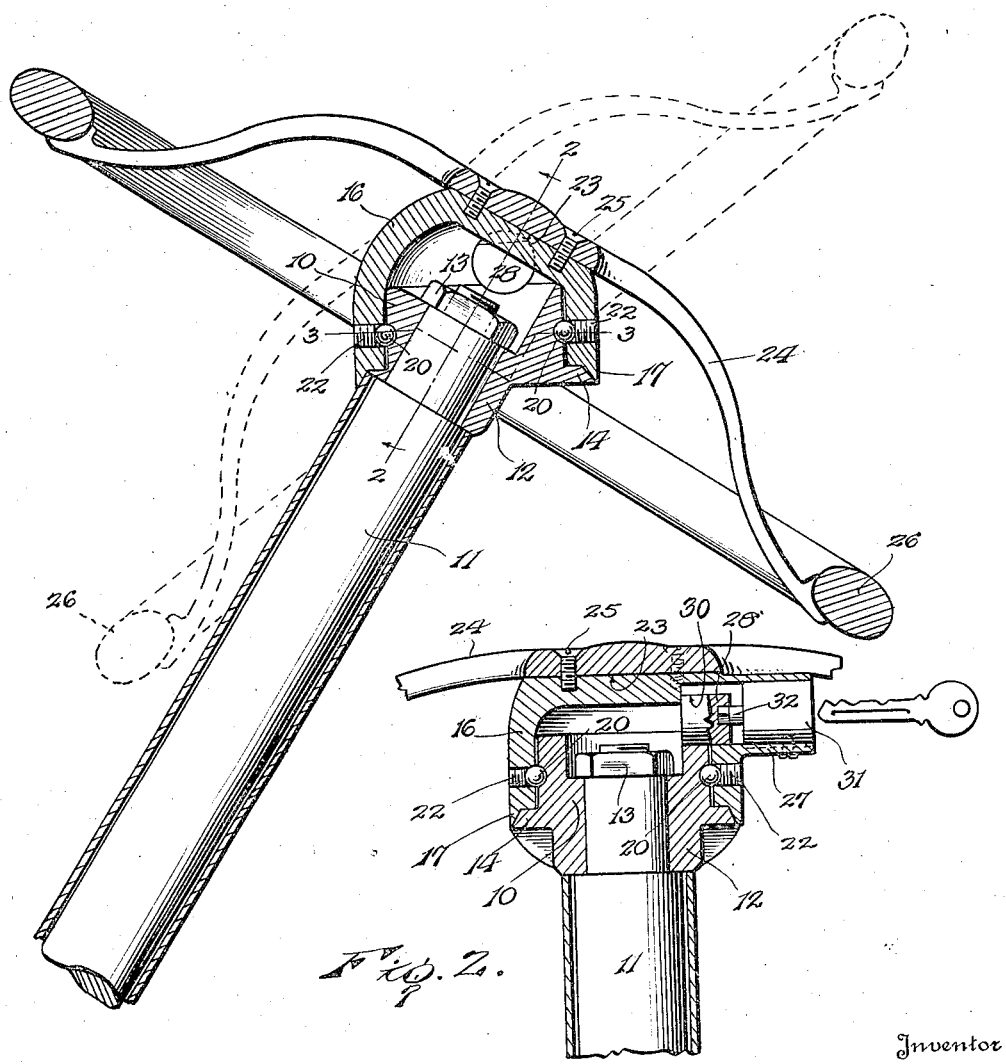

Sept. 18, 1923.

G. POTCHERNICK

STEERING WHEEL

Filed Aug. 12, 1922

1,468,324

2 Sheets-Sheet 2

Inventor
G. Potchernick.

By Lacy & Lacy, Attorneys

Patented Sept. 18, 1923.

1,468,324

UNITED STATES PATENT OFFICE.

GEORGE POTCHERNICK, OF SAN ANTONIO, TEXAS.

STEERING WHEEL.

Application filed August 12, 1922. Serial No. 581,518.

*To all whom it may concern:*

Be it known that I, GEORGE POTCHERNICK, a citizen of the United States, residing at San Antonio, in the county of Bexar and State of Texas, have invented certain new and useful Improvements in Steering Wheels, of which the following is a specification.

This invention relates to an improved steering wheel for motor vehicles and seeks, as one of its principal objects, to provide a device wherein the wheel may be readily tilted upon the steering post of the vehicle so as to furnish additional room between the wheel and the driver's seat of the vehicle whereby the driver may readily enter or leave said seat.

The invention has as a further object to provide a device wherein the steering wheel may be tilted by rotating the wheel individually.

And the invention has as a still further object to provide a steering wheel which may be readily attached to steering posts of conventional design, wherein the wheel may be locked for turning the post and wherein the wheel may also be readily unlocked to freely turn independently of the post to thus prevent unauthorized use of the vehicle.

Other and incidental objects will appear hereinafter.

Figure 4:
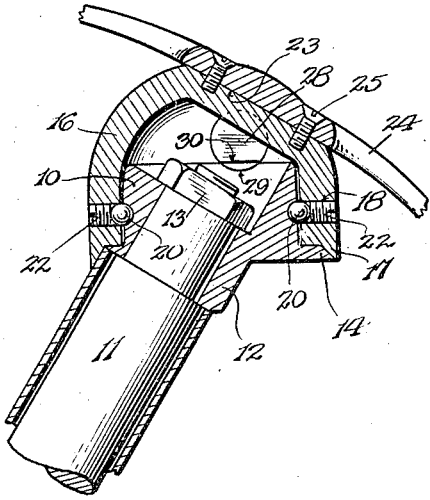
Figure 5:
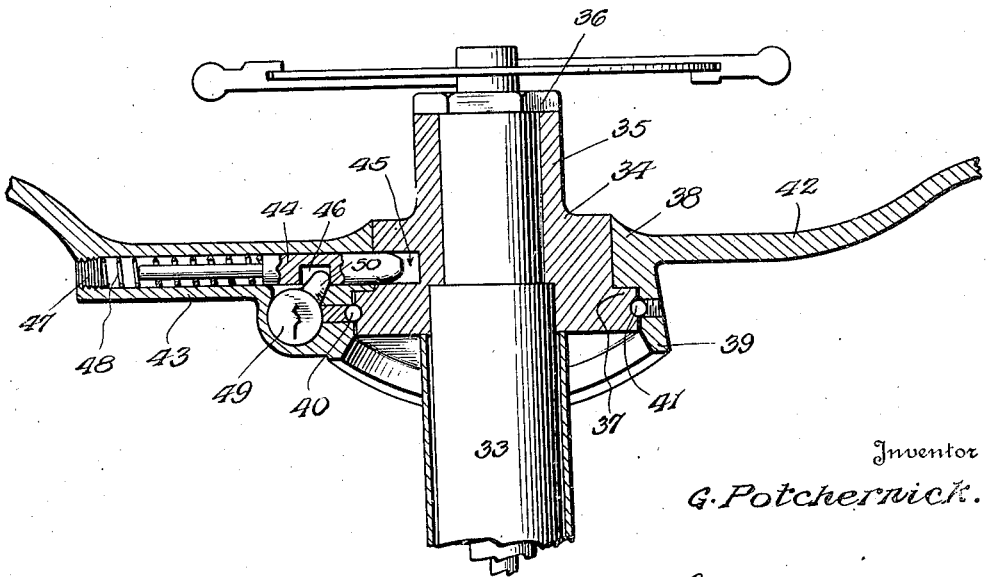

In the drawings:

Figure 1 is a vertical sectional view showing my improved steering wheel in connection with a conventional motor vehicle steering post, Figure 2 is a sectional view on the line 2—2 of Figure 1, looking in the direction of the arrows, Figure 3 is a sectional view on the line 3—3 of Figure 1, Figure 4 is a view similar to Figure 1, showing the steering wheel locked for turning the steering post, and Figure 5 is a sectional view showing a slight modification of the invention.

In carrying the invention into effect, I employ a cylindrical head 10 having an obliquely directed opening therethrough to fit the upper end of a steering post conventionally illustrated in the drawings at 11. The head may be keyed or otherwise secured to the post and is provided at its lower side with an annular flange 12 having its axis tilted with respect to the axis of the head so that the lower edge of said flange gradually merges into the lower face of the head. The flange 12 snugly fits the upper terminal of the post and threaded upon the post is a nut 13 securing the head against upward displacement. At its lower end, the head is provided with a radial base flange 14 lying at right angles to the axis of the head and formed in the periphery of the head is, as shown in Figure 3, an annular groove 15.

Fitting over the head 10 is a substantially hemi-spherical cap or hub 16, the lower edge of which closely confronts the base flange 14 of the head and extending from said edge of the hub is an annular flange 17 overhanging the flange 14 so that a wrench cannot be applied to the flange 14 for turning the head. Formed through the wall of the hub at the level of the groove 15 is a plurality of radial openings 18. Eight of these openings are preferably provided and inserted in said openings to lie partially within the openings and partially within said groove are balls, four of which have, for convenience, been indicated at 19 while the other four have been indicated at 20. Sealing the balls 19 against outward displacement are plugs 21 and adjustable behind the balls 20 are set screws 22. The plugs 21 are permanently secured to the hub so that, as will be seen, the balls 19 will be held in position coacting between the head and the hub locking the hub against upward displacement from the head while when wear occurs between the hub and head, the set screws 22 may be adjusted for advancing the balls 20 to take up such wear. At the same time, all of the balls will coact between the head and hub to rotatably support the hub for free individual movement. Formed on the hub eccentrically to the axis thereof is a flat face 23 tilted downwardly toward one side of the hub and resting against said face is a wheel spider 24 secured to the hub by screws or other suitable fastening devices 25. However, if preferred, the hub and spider may be formed as an integral structure and supported by the spider is a rim or grip 26. Formed on the hub at one side thereof is, as shown in Figure 2, a boss 27 and rotatably mounted in said boss is a cylindrical locking bolt 28 overhanging the upper end edge of the head 10 which is provided with a concave recess 29 to accommodate the bolt. Formed on the bolt at its inner end is a flat face 30 and fixed in the outer end of the boss 27 is an appropriate lock 31 having a stud 32 engaging the bolt for rotating the bolt when the cylinder of the lock is turned.

As will now be understood in view of the preceding description, when the hub 16 is rotated to the position shown in Figure 1, the lock 31 may be operated for rotating the bolt 28 to engage in the recess 29 of the head 10 forming a rigid connection between the hub and head. In this position of the hub, the flat face 23 will be disposed to support the rim 26 of the wheel lying in a plane at right angles to the axis of the steering post concentrically thereof so that the wheel may be operated in the usual manner for turning the steering post and guiding the vehicle. To shift the steering wheel into position out of the way, the lock 31 is operated to turn the bolt 28 until the flat face 30 thereof is, as shown in Figure 4, disposed to confront the recess 29 in the head when the bolt will clear the head. Accordingly, the hub 16 may then be rotated individually upon the head in either one direction or the other and due to the eccentric mounting of the wheel upon the hub, the wheel will, as the hub is rotated, be tilted to a position, as shown in dotted lines in Figure 1, lying nearly parallel to the steering post at the upper side thereof. Increased clearance between the wheel and the driver's seat of the vehicle will thus be provided, the wheel being practically out of the way. Furthermore, by withdrawing the key from the lock 31, after the bolt 28 has been turned to release the wheel, operation of the bolt to again render the wheel active when turned to its normal position, will be prevented. Thus, the wheel cannot, under such conditions, be employed for steering the vehicle so that unauthorized use of the vehicle will, in turn, also be prevented.

In Figure 5 of the drawings, I have illustrated a slight modification of the invention adapting the device for use in any instance wherein control levers are mounted at the upper end of the steering post. In this figure, a steering post is conventionally illustrated at 33 and fixed to the upper end thereof is a head 34. This head is similar to the head 10 of the preferred construction but instead of being provided with a flange at its lower side, is provided with a flange 35 at its upper side to receive the post and threaded upon the post is a nut 36 securing the head against upward displacement. Formed on the head is a base flange 37 and rotatably surrounding the head is a hub 38 having a flange 39 overhanging the base flange 37 of the head. The flange 37 is provided with an annular groove and engaging in said groove are balls 40 and 41 mounted in a manner similar to the balls 19 and 20 and serving a like function. Radiating from the hub is a spider 42 tilted with respect to the axis of the hub and formed beneath one of the arms of the spider is a boss 43. Slidable in said boss is a locking bolt 44 engageable in an opening 45 in the head 34 and provided with a notch 46. Closing the boss at its outer end is a plug 47 and bearing between said plug and the bolt is a spring 48. The boss is provided at its inner end with an enlargement and mounted in said enlargement is an appropriate lock 49 having an arm 50 engaging in the notch 46 of the bolt so that the lock may be operated for retracting the bolt and freeing the hub for individual movement.

Otherwise, this modification is identical with the preferred construction and further description is accordingly believed unnecessary.

Having thus described the invention, what is claimed as new is:

1. A steering wheel including a head for attachment to a steering post, a grip, and a hub sustaining the grip and rotatable upon the head about an axis tilted with respect to the longitudinal axis of the steering post for tilting the grip with respect to the steering post.

2. A steering wheel including a head for attachment to a steering post, a grip, and a hub sustaining the grip movable upon the head in a single plane tilted with respect to the longitudinal axis of the steering post for tilting the grip with respect to the steering post.

3. A steering wheel including a head for attachment to a steering post, a grip, a hub sustaining the grip and rotatable upon the head about an axis tilted with respect to the longitudinal axis of the steering post for tilting the grip with respect to the steering post, and means to coact between the hub and head for locking the hub and head to turn in unison.

4. A steering wheel including a head for attachment to a steering post, a grip, a hub sustaining the grip and rotatable upon the head about an axis tilted with respect to the longitudinal axis of the steering post for tilting the grip with respect to the steering post, the head being formed at its upper edge with a recess, and a lock operated bolt upon the hub rotatable to extend into said recess locking the hub and head to turn in unison.

5. A steering wheel including a head for attachment to a steering post, a grip, a hub sustaining the grip and rotatable upon the head about an axis tilted with respect to the longitudinal axis of the steering post for tilting the grip with respect to the steering post, and anti-friction devices coacting between the hub and head rotatably supporting the hub and locking the hub against displacement from the head.

6. A steering wheel including a head for attachment to a steering post, a grip, a hub sustaining the grip and rotatable upon the head about an axis tilted with respect to the longitudinal axis of the steering post for tilting the grip with respect to the steering post, anti-friction devices coacting between the hub and head rotatably supporting the hub and locking the hub against displacement from the head, and means for adjusting certain of said devices to take up wear between the hub and head.

7. A steering wheel including a head for attachment to a steering post, a hub mounted to turn upon the head, about an axis tilted with respect to the longitudinal axis of the steering post, and a grip operatively connected with the hub eccentrically of the axis of rotation thereof, the hub being rotatable upon the head for tilting the grip with respect to the steering post.

8. A steering wheel including a head, a hub mounted to turn upon the head about an axis tilted with respect to the longitudinal axis of the steering post, and a grip operatively connected with the hub eccentrically of the axis of rotation thereof and being tilted with respect to the axis of the hub, the hub being rotatable upon the head for tilting the grip with respect to the steering post.

9. A steering wheel including a head for attachment to a steering post, a hub limited to turn upon the head about an axis tilted with respect to the longitudinal axis of the steering post, and a grip sustained by the head, the head being rotatable for tilting the grip with respect to the steering post.

10. A steering wheel including a head for attachment to a steering post, a hub mounted to turn upon the head, about an axis tilted with respect to the axis of the head, and a grip sustained by the head tilted with respect to the axis of the head, the hub being rotatable for tilting the grip with respect to the steering post.

In testimony whereof I affix my signature.

GEORGE POTCHERNICK. [L. S.]